United States Patent
Sasaki et al.

(10) Patent No.: US 7,008,894 B2
(45) Date of Patent: Mar. 7, 2006

(54) HIGH PERMITTIVITY DIELECTRIC CERAMIC COMPOSITION AND ELECTRONIC DEVICE

(75) Inventors: Norio Sasaki, Tokyo (JP); Yoshiharu Watanabe, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/394,012

(22) Filed: Mar. 24, 2003

(65) Prior Publication Data
US 2003/0191011 A1   Oct. 9, 2003

(30) Foreign Application Priority Data
Mar. 26, 2002 (JP) ............... 2002-084678

(51) Int. Cl.
*C04B 35/468* (2006.01)

(52) U.S. Cl. ..................... 501/138; 501/139

(58) Field of Classification Search ............... 501/137, 501/138, 139
See application file for complete search history.

(56) References Cited

U.S. PATENT DOCUMENTS 5,604,166 A * 2/1997 Sasaki et al. ............... 501/137

FOREIGN PATENT DOCUMENTS

| JP | A-60-101803 | 6/1985 |
|---|---|---|
| JP | A-02-123614 | 5/1990 |
| JP | (A) 3-65558 | 3/1991 |
| JP | (A) 7-267732 | 10/1995 |

* cited by examiner

*Primary Examiner*—Karl Group
(74) *Attorney, Agent, or Firm*—Oliff & Berridge, PLC

(57) ABSTRACT

A high permittivity dielectric ceramic composition wherein a main component includes $BaTiO_3$: 74.24 to 79.97 mol %, $BaZrO_3$: 5.69 to 12.04 mol %, $CaTiO_3$: 7.84 to 12.13 mol %, $MgTiO_3$: 3.11 to 4.72 mol % and $Bi_2TiO_5$: 0.10 to 0.60 mol %. With respect to 100 wt % of the main component, 0.1 or less (excepting 0) of NiO, 0.1 wt % or less (excepting 0) of $CeO_2$, and 0.2 wt % or less (excepting 0) of MnO are included. In accordance with need, 0.2 wt % or less (excepting 0) of $SiO_2$ is further included with respect to 100 wt % of the main component. A high relative permittivity, such as 9000 or more, a high AC breakdown voltage, and a small electrostatic capacity change rage with respect to temperature can be obtained.

12 Claims, No Drawings

HIGH PERMITTIVITY DIELECTRIC CERAMIC COMPOSITION AND ELECTRONIC DEVICE

BACKGROUND OF THE INVENTION

1. Field of the Invention

The present invention relates to a dielectric ceramic composition, particularly relates to a high permittivity dielectric ceramic composition wherein a relative permittivity is high as 9000 or more, change in the relative permittivity with respect to temperature is small, and an AC breakdown voltage is high.

2. Description of the Related Art

As a high permittivity ceramic composition broadly used as a ceramic capacitor, multilayer capacitor, high frequency capacitor, high-voltage capacitor, etc., conventionally, those having a $BaTiO_3$—$CaTiO_3$—$MgTiO_3$ base ceramic composition as a main component have been practically used in general.

In $BaTiO_3$—$CaTiO_3$—$MgTiO_3$ base dielectrics of the related art, however, the electrostatic capacity change rate with respect to temperature becomes large, when the relative permittivity is made high as 6000 or more. Also, there is a disadvantage that the AC breakdown voltage becomes low as 2.0 to 3.0 kV/mm.

The present inventors have proposed $BaTiO_3$—$CaTiO_3$—$MgTiO_3$ base dielectric ceramic compositions as disclosed in the Japanese Unexamined Patent Publications (kokai) No. 3-65558 and No. 7-267723, but the relative permittivity did not reach 9000 in neither of the inventions.

SUMMARY OF THE INVENTION

An object of the present invention is to provide a high permittivity dielectric ceramic composition having a high relative Permittivity as 9000 or more, high AC breakdown voltage and small electrostatic capacity change rate with respect to temperature, and a capacitor and other electronic devices using the same as a dielectric layer.

To attain the above object, according to a first aspect of the present invention, there is provided a high permittivity dielectric ceramic composition, comprising 0.1 wt % or less (excepting 0) of NiO, 0.1 wt % or less (excepting 0) of $CeO_2$, and 0.2 wt % or less (excepting 0) of MnO with respect to 100 wt % of a main component including $BaTiO_3$: 74.24 to 79.97 mol %

$BaZrO_3$: 5.69 to 12.04 mol %

$CaTiO_3$: 7.84 to 12.13 mol %

$MgTiO_3$: 3.11 to 4.72 mol % and $Bi_2TiO_5$: 0.10 to 0.60 mol % in total of 100 mol % of the main component.

According to the first aspect of the present invention, a dielectric ceramic composition having excellent properties, such as a high relative permittivity of 9000 or more, small electrostatic capacity change rate with respect to temperature, high insulation resistance and breakdown voltage, small dielectric loss and preferable sintering property, can be obtained.

According to a second aspect of the present invention, there is provided a high permittivity dielectric ceramic composition, comprising 0.1 wt % or less (excepting 0) of NiO, 0.1 wt % or less (excepting 0) of $CeO_2$, and 0.2 wt % or less (excepting 0) of MnO with respect to 100 wt % of a main component including $BaTiO_3$: 74.38 to 79.79 mol %

$BaZrO_3$: 7.33 to 10.15 mol %

$CaTiO_3$: 8.34 to 12.13 mol %

$MgTiO_3$: 3.40 to 3.76 mol % and $Bi_2TiO_5$: 0.10 to 0.60 mol % in total of 100 mol % of the main component.

According to the second aspect of the present invention, a dielectric ceramic composition having excellent properties, such as a high relative permittivity of about 9200 or more, small electrostatic capacity change rate with respect to temperature, high insulation resistance and breakdown voltage, small dielectric loss and preferable sintering property can be obtained.

In the second aspect of the present invention, preferably, 0.04 to 0.10 wt % of NiO, 0.03 to 0.10 wt % of $CeO_2$, and 0.01 to 0.19 wt % (excepting 0) of MnO are included with respect to 100 wt % of the main component. In this case, the relative permittivity becomes particularly high and the insulation resistance and sintering property also improve.

In the first and second aspects of the present invention, preferably, 0.2 wt % or less (excepting 0) of $SiO_2$ is further included with respect to 100 wt % of said main component.

The insulation resistance and breakdown voltage are improved by being contained $SiO_2$. Note that it is preferable not to contain $SiO_2$ to improve the relative permittivity and sintering property.

An electronic device according to the present invention comprises a dielectric layer and the dielectric layer is comprised of the above high permittivity dielectric ceramic composition.

DESCRIPTION OF THE PREFERRED EMBODIMENTS

A high permittivity dielectric ceramic composition according to an embodiment of the present invention comprises 0.1 wt % or less (excepting 0) of NiO, 0.1 wt % or less (excepting 0) of $CeO_2$, and 0.2 wt % or less (excepting 0) of MnO with respect to 100 wt % of a main component including $BaTiO_3$: 74.24 to 79.97 mol %

$BaZrO_3$: 5.69 to 12.04 mol %

$CaTiO_3$: 7.84 to 12.13 mol %

$MgTiO_3$: 3.11 to 4.72 mol % and $Bi_2TiO_5$: 0.10 to 0.60 mol % in total of 100 mol % of the main component.

Preferably, the above main component includes $BaTiO_3$: 74.38 to 79.79 mol %

$BaZrO_3$: 7.33 to 10.15 mol %

$CaTiO_3$: 8.34 to 12.13 mol %

$MgTiO_3$: 3.40 to 3.76 mol % and $Bi_2TiO_5$: 0.10 to 0.60 mol %.

When a content of $BaTiO_3$ in the main component is too small, there are tendencies that the relative permittivity declines, the electrostatic capacity change rate with respect to temperature becomes large and the breakdown voltage also declines. Inversely, when the content is too great, there are tendencies that the dielectric lose deteriorates by becoming large, the breakdown voltage becomes low and the electrostatic capacity change rate with respect to temperature becomes large.

When a content of $BaZrO_3$ in the main component is too small, there are tendencies that the dielectric loss is deteriorated by becoming large, the relative permittivity becomes low and the electrostatic capacity change rate with respect to temperature becomes large. While when the content becomes too great, there are tendencies that although the dielectric lose becomes small, the relative permittivity becomes low, the insulation resistance becomes small, and the breakdown voltage becomes low.

When a content of $CaTiO_3$ in the main component is too small, there are tendencies that the relative permittivity becomes small, the insulation resistance becomes small and the breakdown voltage deteriorates. Inversely, when the content is too great, there are tendencies that the relative permittivity becomes small and insulation resistance becomes small.

When a content of $MgTiO_3$ in the main component is too small, there are tendencies that the insulation resistance becomes small, the breakdown voltage declines, and the electrostatic capacity change rate with respect to temperature becomes large. Inversely, when the content is too great, there are tendencies that the relative permittivity deteriorates and sintering property also deteriorates.

When a content of $Bi_2TiO_5$ in the main component is too small, there are tendencies that the dielectric loss is deteriorated by becoming large, electrostatic capacity change rate with respect to temperature becomes large, and the insulation resistance declines. Inversely, when the content is too large, there are tendencies that the relative permittivity declines, breakdown voltage becomes low, and sintering property becomes poor.

Furthermore, in the present invention, by making preferably 0.04 to 0.10 wt % of NiO, 0.03 to 0.10 wt % of $CeO_2$ and 0.01 to 0.19 wt % (excepting 0) of MnO contained with respect to 100 wt % of the main component, particularly the relative permittivity becomes high and also the insulation resistance and the sintering property are improved.

The dielectric ceramic composition may further include not more than 0.2 wt % (including 0) of $SiO_2$ with respect to 100 wt % of the main component. When $SiO_2$ is included, the insulation resistance and breakdown voltage tend to improve, while when $SiO_2$ is not included, the relative permittivity and sintering property tend to improve.

A production method for producing the dielectric ceramic composition of the present invention is not particularly limited and a general production method used in a production method of ceramic capacitors and multilayer ceramic capacitors may be used.

For example, as dielectric materials which are used to produce the dielectric ceramic composition, materials composing a main component and materials composing additive components (subcomponents) are used in accordance with the composition of the above dielectric ceramic composition. As the materials composing the main component, oxides of Ti, Ba, Zr, Ca, Mg and Bi and/or compounds which become oxides by being fired are used. As the material composing the subcomponents, oxides of Ni, Ce, Mn and Si and/or compounds which become oxides by being fired are used.

These dielectric materials are measured so that a composition after fired becomes the above composition and mixed. The mixture is calcined. After that, the mixture is granulated to be powder by a well known method, then the powder is molded and fired so that a ceramic element (dielectric layer) composed of a dielectric ceramic composition can be obtained.

The ceramic capacitor can be obtained by forming electrodes on both surfaces of the ceramic element.

Alternately, the above dielectric materials are mixed with an organic vehicle to be used as a dielectric paste so that a green chip is produced with a separately prepared internal electrode paste by a normal printing method or a sheet method. After firing the green chip, external electrodes are printed or transferred so that a multilayer ceramic capacitor can be obtained.

EXAMPLE

Below, examples of the present invention will be explained. First, a production procedure of a high permittivity dielectric ceramic composition according to the examples of the present invention will be explained.

As starting materials, barium carbonate ($BaCO_3$), titanium oxide ($TiO_2$), zirconium oxide ($ZrO_2$), calcium carbonate ($CaCO_3$), magnesium carbonate ($MgCO_3$), bismuth oxide ($Bi_2O_3$), nickel oxide (NiO), cesium oxide ($CeO_2$), manganese oxide (MnO) and silicon oxide ($SiO_2$) were used. These starting materials were measured so that compositions after fired become compositions shown in Table 1 and Table 2, the obtained blends of materials were wet mixed in a pot mill for 16 hours, then dehydrated, dried and calcined at 1140° C. to 1200° C. to bring chemical reaction.

The results were finely milled again in a pot mill, dehydrated and dried, added polyvinyl alcohol (PVA) as an organic binder, granulated and sized so that particle powders were obtained. The particle powders were molded with a molding pressure of 300 MPa to be disks having a diameter of 16.5 mm and a thickness of 1.1 mm. The molded materials were fired at 1280 to 1360° C. in the air, and ceramic elements were obtained.

The thus obtained ceramic elements were formed with electrodes on both end surfaces thereof by baking a silver (Ag) paste, leads were soldered thereon to obtain ceramic capacitor samples. Electric properties of the thus obtained capacitor samples were measured. The results are shown in Table 1 and Table 2.

TABLE 1

| Sample No. | Main Component (mol %) | | | | | Additives (wt %) | | | | Relative Permittivity δs | Dielectric Loss tan δ (%) | Insulation Resistance IR (Ω) × 10^11 | Breakdown Voltage AC · Eb (KV/mm) | Electrostatic Capacity Change Rate Δ C/C20 (%) | | Sintering Property |
| --- | --- | --- | --- | --- | --- | --- | --- | --- | --- | --- | --- | --- | --- | --- | --- | --- |
| | BaTiO3 | BaZrO3 | CaTiO3 | MgTiO3 | B12TiO5 | NiO | CeO2 | MnO2 | SiO2 | | | | | −25° C. | +85° C. | |
| *1 | *73.86 | 11.08 | 11.28 | 3.48 | 0.30 | 0.04 | 0.03 | 0.05 | 0.05 | *8590 | *1.9 | *1.8 | *3.2 | *−58* | −55 | ○ |
| *2 | 74.66 | 10.14 | 11.68 | 3.52 | *0.00 | 0.04 | 0.03 | 0.05 | 0.05 | 9400 | *2.5 | *1.1 | 4.5 | *−60 | −41 | ○ |
| 3 | 74.58 | 10.14 | 11.68 | 3.52 | 0.10 | 0.04 | 0.03 | 0.05 | 0.05 | 9310 | 1.6 | 2.1 | 5.1 | −54 | −54 | ○ |
| 4 | 74.38 | 10.15 | 11.68 | 3.51 | 0.30 | 0.04 | 0.03 | 0.05 | 0.05 | 9280 | 1.6 | 2.2 | 5.8 | −53 | −53 | ○ |
| 5 | 74.24 | 10.13 | 11.63 | 3.40 | 0.60 | 0.04 | 0.03 | 0.05 | 0.05 | 9210 | 1.4 | 2.7 | 5.9 | −52 | −54 | ○ |
| *6 | 74.24 | 10.13 | 11.63 | 3.40 | 0.60 | *0.30 | 0.03 | 0.05 | 0.05 | 9420 | 1.2 | 2.5 | *3.8 | −49 | *−61 | ○ |
| *7 | 74.24 | 10.13 | 11.63 | 3.40 | 0.60 | 0.04 | *0.15 | 0.05 | 0.05 | 9320 | 1.3 | 2.3 | 4.1 | −52 | *−58 | ○ |
| 8 | 74.24 | 10.13 | 11.63 | 3.40 | 0.60 | 0.10 | 0.03 | 0.05 | 0.05 | 9350 | 1.0 | 2.0 | 4.2 | −51 | −53 | ○ |
| 9 | 74.24 | 10.13 | 11.63 | 3.40 | 0.60 | 0.04 | 0.10 | 0.20 | 0.05 | 9230 | 1.3 | 3.4 | 4.6 | −54 | −53 | ○ |
| *10 | 74.24 | 10.13 | 11.63 | 3.40 | 0.60 | 0.04 | 0.03 | *0.50 | 0.05 | *7820 | *2.1 | *1.3 | *3.8 | −47 | −49 | X |
| 11 | 74.24 | 10.13 | 11.63 | 3.40 | 0.60 | 0.04 | 0.03 | 0.20 | 0.05 | 9190 | 1.3 | 2.9 | 4.4 | −54 | −54 | ○ |
| *12 | 74.24 | 10.13 | 11.63 | 3.40 | 0.60 | 0.04 | 0.03 | 0.05 | *0.50 | *7580 | 1.4 | 2.7 | *3.9 | −47 | −45 | X |
| *13 | 75.34 | 9.22 | 10.23 | 4.21 | *1.00 | 0.04 | 0.03 | 0.05 | 0.05 | *8670 | 0.7 | 3.1 | *3.7 | −39 | −54 | X |
| *14 | 79.13 | *4.22 | *12.40 | 3.73 | 0.32 | 0.04 | 0.03 | 0.05 | 0.05 | *8730 | *3.6 | 1.9 | *3.1 | *−57 | −47 | ○ |
| 15 | 76.29 | 5.69 | 12.00 | 3.70 | 0.32 | 0.04 | 0.03 | 0.05 | 0.05 | 9020 | 1.7 | 1.9 | 5.5 | −54 | −50 | ○ |
| *16 | 74.91 | 8.09 | 11.25 | *5.25 | 0.50 | 0.04 | 0.03 | 0.05 | 0.05 | *8120 | 1.7 | 2.5 | 5.1 | −52 | −51 | X |
| 17 | 78.95 | 6.54 | 9.32 | 4.72 | 0.47 | 0.04 | 0.03 | 0.20 | 0.05 | 9140 | 1.6 | 2.3 | 5.2 | −55 | −50 | ○ |
| 18 | 76.48 | 7.33 | 12.13 | 3.61 | 0.45 | 0.04 | 0.03 | 0.05 | 0.05 | 9380 | 1.1 | 3.8 | 5.3 | −53 | −54 | ○ |
| 19 | 79.79 | 7.64 | 8.34 | 3.76 | 0.47 | 0.04 | 0.03 | 0.05 | 0.05 | 9830 | 1.2 | 2.1 | 4.9 | −55 | −55 | ○ |
| *20 | 79.79 | 7.64 | 8.34 | 3.76 | 0.47 | *0.30 | 0.03 | 0.05 | 0.05 | 9570 | 1.0 | 2.5 | *3.7 | −53 | *−59 | ○ |
| *21 | 79.79 | 7.64 | 8.34 | 3.76 | 0.47 | 0.04 | *0.15 | 0.05 | 0.05 | 9410 | 1.1 | 2.1 | 4.1 | −52 | *−80 | ○ |
| 22 | 79.79 | 7.64 | 8.34 | 3.76 | 0.47 | 0.04 | 0.03 | 0.05 | 0.05 | 9390 | 1.0 | 2.8 | 4.7 | −53 | −54 | ○ |
| 23 | 79.79 | 7.64 | 8.34 | 3.76 | 0.45 | 0.04 | 0.10 | 0.05 | 0.05 | 9310 | 1.3 | 3.1 | 4.6 | −52 | −54 | ○ |
| *24 | 79.79 | 7.64 | 8.34 | 3.76 | 0.47 | 0.04 | 0.03 | *0.50 | 0.05 | *8650 | 1.1 | *1.6 | *3.8 | −48 | −51 | X |
| 25 | 79.79 | 7.64 | 8.34 | 3.76 | 0.47 | 0.04 | 0.03 | 0.20 | 0.05 | 9290 | 1.1 | 2.7 | 4.5 | −54 | −54 | ○ |
| *26 | 79.79 | 7.64 | 8.34 | 3.76 | 0.47 | 0.10 | 0.03 | 0.05 | *0.50 | *8270 | 1.2 | *1.8 | 4.1 | −48 | −43 | X |
| 27 | 75.14 | 11.09 | 10.94 | 3.52 | 0.31 | 0.04 | 0.03 | 0.50 | 0.50 | 9120 | 1.0 | 3.9 | 5.4 | −44 | −54 | ○ |
| *28 | 77.26 | 11.82 | *6.82 | 3.70 | 0.40 | 0.04 | 0.03 | 0.05 | 0.05 | 9140 | 1.2 | 3.2 | *2.4 | −54 | *−57 | ○ |
| *29 | 77.11 | 10.42 | 10.26 | *2.00 | 0.20 | 0.04 | 0.03 | 0.05 | 0.05 | 9070 | 1.3 | *1.4 | *2.8 | −49 | *−59 | ○ |
| 30 | 78.33 | 7.82 | 11.87 | 3.57 | 0.31 | 0.04 | 0.03 | 0.05 | 0.05 | 9230 | 1.2 | 4.4 | 5.1 | −52 | −53 | ○ |
| 31 | 77.13 | 7.42 | 12.04 | 3.11 | 0.30 | 0.04 | 0.03 | 0.05 | 0.05 | 9400 | 1.5 | 3.1 | 4.1 | −54 | −54 | ○ |
| *32 | 74.28 | 7.12 | *15.26 | 3.04 | 0.51 | 0.04 | 0.03 | 0.05 | 0.05 | *7430 | 1.4 | *1.0 | 5.0 | −49 | −48 | ○ |
| 33 | 79.27 | 9.15 | 7.84 | 3.22 | 0.51 | 0.04 | 0.03 | 0.05 | 0.05 | 9510 | 0.9 | 2.0 | 4.4 | −47 | −53 | ○ |
| *34 | *81.07 | 7.55 | 7.87 | 3.18 | 0.33 | 0.04 | 0.03 | 0.05 | 0.05 | 9060 | *2.9 | 3.4 | *2.1 | *−59 | −52 | X |
| *35 | 75.26 | *12.82 | *7.82 | 3.70 | 0.40 | 0.04 | 0.03 | 0.05 | 0.05 | *7500 | 0.7 | *0.9 | *4.0 | −42 | −48 | X |

TABLE 2

| Sample No. | Main Component (mol %) | | | | | Additives (wt %) | | | | Relative Permittivity |
|---|---|---|---|---|---|---|---|---|---|---|
| | BaTiO3 | BaZrO3 | CaTiO3 | MgTiO3 | B12TiO5 | NiO | CeO2 | MnO2 | SiO2 | Eδ |
| 36 | 76.33 | 7.82 | 11.97 | 3.57 | 0.31 | 0.01 | 0.03 | 0.05 | 0.00 | 9130 |
| 37 | 76.33 | 7.82 | 11.97 | 3.57 | 0.31 | 0.04 | 0.03 | 0.05 | 0.00 | 9330 |
| 38 | 76.33 | 7.82 | 11.97 | 3.57 | 0.31 | 0.10 | 0.03 | 0.05 | 0.00 | 9370 |
| *39 | 76.33 | 7.82 | 11.97 | 3.57 | 0.31 | *0.30 | 0.03 | 0.05 | 0.00 | 9690 |
| 40 | 76.33 | 7.82 | 11.97 | 3.57 | 0.31 | 0.04 | 0.01 | 0.05 | 0.00 | 9030 |
| 41 | 76.33 | 7.82 | 11.97 | 3.57 | 0.31 | 0.04 | 0.03 | 0.05 | 0.00 | 9280 |
| *42 | 76.33 | 7.82 | 11.97 | 3.57 | 0.31 | 0.04 | *0.15 | 0.05 | 0.00 | 9400 |
| 43 | 76.33 | 7.82 | 11.97 | 3.57 | 0.31 | 0.04 | 0.03 | 0.05 | 0.00 | 9580 |
| 44 | 76.33 | 7.82 | 11.97 | 3.57 | 0.31 | 0.04 | 0.03 | 0.01 | 0.00 | 9460 |
| 45 | 76.33 | 7.82 | 11.97 | 3.57 | 0.31 | 0.04 | 0.03 | 0.05 | 0.00 | 9310 |
| 46 | 76.33 | 7.82 | 11.97 | 3.57 | 0.31 | 0.04 | 0.03 | 0.20 | 0.00 | 9180 |
| *47 | 76.33 | 7.82 | 11.97 | 3.57 | 0.31 | 0.04 | 0.03 | *0.50 | 0.00 | *7200 |
| 48 | 76.33 | 7.82 | 11.97 | 3.57 | 0.31 | 0.04 | 0.03 | 0.05 | 0.05 | 9300 |
| 49 | 76.33 | 7.82 | 11.97 | 3.57 | 0.31 | 0.04 | 0.03 | 0.05 | 0.2 | 9110 |
| *50 | 76.33 | 7.82 | 11.97 | 3.57 | 0.31 | 0.04 | 0.03 | 0.05 | *0.5 | *7900 |

| Sample No. | Dielectric Loss tan δ (%) | Insulation Resistance IR (Ω) × $10^{11}$ | Breakdown Voltage AC·Eb (KV/mm) | Electrostatic Capacity Change Rate Δ C/C20 (%) | | Sintering Property |
|---|---|---|---|---|---|---|
| | | | | −25° C. | +85° C. | |
| 36 | 1.1 | 4.4 | 5.0 | −53 | −53 | ⊚ |
| 37 | 1.0 | 3.0 | 4.4 | −52 | −54 | ⊚ |
| 38 | 0.8 | 2.0 | 4.3 | −51 | −55 | ⊚ |
| *39 | 0.8 | 2.0 | *2.9 | −50 | −60* | X |
| 40 | 1.2 | 6.5 | 5.5 | −52 | −52 | ⊚ |
| 41 | 1.1 | 6.5 | 5.5 | −52 | −53 | ⊚ |
| *42 | 1.0 | 4.3 | 4.9 | −61 | −61* | ○ |
| 43 | 0.8 | 2.1 | 4.1 | −50 | −54 | ⊚ |
| 44 | 1.0 | 3.4 | 4.7 | −53 | −53 | ⊚ |
| 45 | 1.1 | 4.8 | 4.3 | −54 | −51 | ⊚ |
| 46 | 1.3 | 2.2 | 4.3 | −54 | −45 | ⊚ |
| *47 | *2.5 | *1.1 | 4.3 | −49 | −45 | X |
| 48 | 1.3 | 4 | 5.7 | −53 | −53 | ⊚ |
| 49 | 1.2 | 5.5 | 4.7 | −51 | −50 | ⊚ |
| *50 | 1.1 | 3.2 | *3.2 | −48 | −45 | X |

Note that in measurements of the respective electric properties in Table 1 and Table 2, the relative permittivity (es) and dielectric loss (tan δ) were measured by using an LCR meter under conditions of a frequency of 1 KHz, voltage of 1 kHz and a voltage of 1 V and the insulation resistance (IR) was measured by applying an AC voltage of 500V. Also, the breakdown voltage was measured as an AC breakdown voltage (Ac·Eb) per a unit thickness. Furthermore, as to the electrostatic capacity change rate, an electrostatic capacity of the capacitor samples was measured at a voltage of 1 V when the reference temperature was set 20° C. by using an LCR meter and a change rate % of the electrostatic capacity was obtained at temperatures of −25° C. and +85° C.

As to the sintering property, samples fired at a firing temperature of 1320° C. were examined and those having poor sintering property are checked "X", good sintering property are checked "○" a and particularly good wintering property are checked "⊚". The standard of judging the sintering property was defined as below. Namely, "X" was checked when the sintered density was less than 5.9 g/cm₃ or 6 or more out of 10 samples were insufficiently sintered, "○" was checked when the sintered density was not less than 5.5 g/cm³ or 0 or less out of 10 samples were insufficiently sintered, and "⊚" was checked when the sintered density was not less than 5.55 g/cm₃ or 0 or less out of 10 samples were insufficiently sintered.

In Table 1 and Table 2, samples with "*" mark added to their sample numbers indicate that they are out of a preferable range of the present invention. Note that in Table 1 and Table 2, the preferable ranges of the properties were set to be the relative permittivity of 9000 or more, the dielectric loss of 1.7 or less, the insulation resistance of $1.9 \times 10^{11}$ Ω or more, the breakdown voltage of 4.1 or more, and the electrostatic capacity change rate of within −55%.

Evaluation

As shown in the sample number 1 in Table 1, when a content of $BaTiO_3$ in the main component was less than 74.24 mol %, it was confirmed that the relative permittivity as widely declines to be less than 9000, the electrostatic capacity change rate with respect to temperature becomes larger than −55% at −25° C., and the breakdown voltage deteriorates to be less than 4.1 kV. Furthermore, in the sample number 1, it was confirmed that the dielectric loss was more than 1.7 and the insulation resistance was less than 1.9, which were not preferable.

On the other hand, in sample numbers 5, 8, 9 and 11, it was confirmed that the content of $BaTiO_3$ in the main component was 74.24 mol % and the preferable ranges of the properties were confirmed to be all satisfied.

As shown in a sample number 34, when the content of $BaTiO_3$ exceeded 79.97 mol %, it was confirmed that the dielectric loss was deteriorated by becoming large as more than 1.7, the breakdown voltage became low as not reaching 4.1 kV, and the electrostatic capacity change rate with respect to temperature became large as more than −55% at −25° C.

On the other hand, in sample numbers 19, 22, 23 and 25, the content of $BaTiO_3$ was 79.79 mol % which in close to 79.97 mol % and the preferable ranges of the properties were confirmed to be all satisfied.

As shown in a sample number 14, when a content of $BaZrO_3$ in the main component was less than 5.69 mol %, it was confirmed that the dielectric loss was widely deteriorated by becoming large as exceeding 1.7, the relative permittivity became low as less than 9000, and the electrostatic capacity change rate with respect to temperature became large as more than −55% at −25° C. Furthermore, in the sample number 14, the breakdown voltage was low as less than 4.1 kV.

On the other hand, in the sample number 15, the content of $BaZrO_3$ in the main component was 5.69 mol % and the preferable ranges of the properties were confirmed to be all satisfied.

As shown in the sample number 35, when the content of $BaZrO_3$ in the main component became more than 12.04 mol %, it was confirmed that while the dielectric loss became small, the relative permittivity became low as less than 9000, the insulation resistance IR (Ω) became small as less than $1.9 \times 10^{11}$ Ω, and the breakdown voltage became low as less than 4.1 kV.

On the other hand, in the sample number 27 wherein the content of $BaZrO_3$ was 11.09 mol % which is close to 12.04 mol %, the preferable ranges of the properties were confirmed to be all satisfied.

As shown in the sample number 35, when a content of $CaTiO_3$ in the main component became less than 7.84 mol %, it was confirmed that the relative permittivity became less than 9000, the insulation resistance IR (Ω) became small as less than $1.9 \times 10^{11}$ Ω, and the breakdown voltage declined as not reaching 4.1 kV.

On the other hand, in the sample number 33, the content of $CaTiO_3$ in the main component was 7.84 mol % and the preferable ranges of the properties were confirmed to be all satisfied.

As shown in sample numbers 14 and 32, when the content of $CaTiO_3$ exceeded 12.13 mol %, it was confirmed that the relative permittivity became small as less than 9000 and the insulation resistance IR (Ω) became low as not reaching $1.9 \times 10^{11}$ Ω.

On the other hand, in the sample number 18, the content of $CaTiO_3$ was 12.13 mol % and the preferable ranges of the properties were confirmed to be all satisfied.

As shown in the sample number 29, when a content of $MgTiO_3$ was less than 3.11 mol %, it was confirmed that the insulation resistance became small as less than $1.9 \times 10^{22}$ Ω, the breakdown voltage declined as not reaching 4.1 kV, and the electrostatic capacity change rate with respect to temperature become larger than −55% at +85° C.

On the other hand, in the sample number 31, the content of $MgTiO_3$ was 3.11 mol % and the preferable ranges of the properties were confirmed to be all satisfied.

As shown in the sample number 16, when the content of $MgTiO_3$ exceeded 4.72 mol %, it was confirmed that the relative permittivity became 9000 or less and the sintering property was deteriorated.

On the contrary, in the sample number 17, the content of $MgTiO_3$ was 4.72 mol % and the preferable ranges of the properties were confirmed to be all satisfied.

As shown in the sample number 2, when a content of $Bi_2TiO_5$ became less than 0.10 mol %, the dielectric loss was deteriorated by becoming large as exceeding 1.7, the electrostatic capacity change rate with respect to temperature became large as 55% or more at −25° C., and the insulation resistance declined.

On the contrary, in the sample number 3, the content of $Bi_2TiO_5$ in the main component was 0.10 mol % and the preferable ranges of the properties were confirmed to be all satisfied.

As shown in the sample number 13, when the content of $Bi_2TiO_5$ became more than 0.60 mol %, it was confirmed that the relative permittivity declined to less than 9000, the breakdown voltage became low as not reaching 4.1 kV, and the sintering property was poor.

On the contrary, in the sample number 11, the content of $Bi_2TiO_5$ was 0.60 mol % and the preferable ranges of the properties were confirmed to be all satisfied.

As shown in sample numbers 6, 20 and 39, when a content of an additive NiO became more than 0.1 wt %, it was confirmed that the electrostatic capacity change rate with respect to temperature became large as −55% or more at 85° C., and the breakdown voltage was deteriorated to less than 4.1 kV.

On the contrary, in sample numbers 8, 22 and 38, the content of the additive NiO was 0.1 wt % and the preferable ranges of the properties were confirmed to be all satisfied.

As shown in sample numbers 7, 21 and 42, when a content of an additive $CeO_2$ became more than 0.1 wt %, the electrostatic capacity change rate with respect to temperature was confirmed to be large as −55% or more at 85° C.

On the contrary, in sample numbers 9 and 23, the content of the additive $CeO_2$ was 0.1 wt % and the preferable ranges of the properties were confirmed to be all satisfied.

As shown in sample numbers 10, 24 and 47, when a content of an additive $MnO_2$ became more than 0.2 wt %, it was confirmed that the relative permittivity was widely declined to less than 9000, the insulation resistance became less than $1.9 \times 10_{11}$ Ω, and the sintering property became poor.

On the contrary, in sample numbers 11, 25 and 46, the content of the additive $MnO_2$ was 0.2 wt % and the preferable ranges of the properties were confirmed to be all satisfied.

According to the above results as shown in Table 1 and Table 2, to satisfy the preferable properties, it was confirmed that preferably 0.1 wt % or less (excepting 0) of NiO, 0.1 wt % or less (excepting 0) of $CeO_2$, and 0.2 wt % or less (excepting 0) of MnO were contained with respect to 100 wt % of a main component including $BaTiO_3$: 74.24 to 79.97 mol %

$BaZrO_3$: 5.69 to 12.04 mol %

$CaTiO_3$: 7.84 to 12.13 mol %

$MgTiO_3$: 3.11 to 4.72 mol % and $Bi_2TiO_5$: 0.10 to 0.60 mol % in total of 100 mol % of the main component.

Evaluation 2

It was confirmed that as shown in sample numbers 36 to 38, 40, 41 and 43 to 46, the preferable properties were obtained even in the case where the additive $SiO_2$ was not added, while when a content of $SiO_2$ became more than 0.2 wt % as shown in sample numbers 12, 26 and 50, the relative permittivity declined as not reaching 9000, and the sintering property declined. Note that in sample numbers 12, 26 and 50, adhesivity is exhibited during firing. The adhesivity indicates a phenomenon that pre-sintered elements arranged in a furnace react to adhere to each other during sintering On the other hand, in sample numbers 8, 22 and 49, the content of $SiO_2$ was 0.2 wt % and the preferable ranges of the properties were confirmed to be all satisfied.

Furthermore, by comparing sample numbers 30 and 37 having exactly the same composition except for $SiO_2$, it was confirmed that the insulation resistance and breakdown voltage improved when $SiO_2$ was contained, while the relative permittivity and sintering property improved when $SiO_2$ was not contained.

Evaluation 3

By comparing sample numbers 1 to 50 shown in Table 1 and Table 2, to improve the relative permittivity to about 9200 or more and satisfy the preferable ranges of other properties, it was confirmed that preferably 0.1 wt % or less (excepting 0) of NiO, 0.1 wt % or less (excepting 0) of $CeO_2$, and 0.2 wt % or less (excepting 0) of MnO were contained with respect to 100 wt % of a main component including $BaTiO_3$: 74.38 to 79.79 mol %
$BaZrO_3$: 7.33 to 10.15 mol %
$CaTiO_3$: 8.34 to 12.13 mol %
$MgTiO_5$: 3.40 to 3.76 mol % and
$Bi_2TiO_5$: 0.10 to 0.60 mol % in total of 100 mol % of the main component.

Also, from the results shown in Table 1 and Table 2, by being contained 0.04 to 0.10 wt % of NiO, 0.03 to 0.10 wt % of $CeO_2$, and 0.01 to 0.19 wt % or less (excepting 0) of MnO with respect to 100 wt % of the main component, it was confirmed that particularly the relative permittivity became high and the insulation resistance and sintering property ware also improved.

Furthermore, $SiO_2$ may be contained also in the above composition. In that case, the content thereof was confirmed to be preferably 0.2 wt % or less.

As explained above, according to the embodiment of the present invention, the dielectric ceramic composition having a high relative permittivity, such as 9000 or more, and small electrostatic capacity change rate with respect to temperature, moreover, a high breakdown voltage can be obtained. Accordingly, the dielectric ceramic composition according to the embodiment of the present invention can be broadly used as a dielectric layer of electronic devices.

As the electronic devices capable of using the dielectric ceramic composition of the present invention, those electronic devices requiring particularly a high permittivity used in an application requiring a small electrostatic capacity change rate with respect to temperature may be mentioned. Specifically, a ceramic capacitor, multilayer capacitor, high frequency capacitor, high-voltage capacitor, etc. may be mentioned.

Note that the present invention is not limited to the above embodiments and a variety of modifications can be made within the scope of the present invention.

What is claimed is:

1. A high permittivity dielectric ceramic composition, comprising 0.1 wt % or less (excepting 0) of NiO, 0.1 wt % or less (excepting 0) of $CeO_2$, and 0.2 wt % or less (excepting 0) of MnO with respect to 100 wt % of a main component including $BaTiO_3$: 74.24 to 79.97 mol %
$BaZrO_3$: 5.69 to 12.04 mol %
$CaTiO_3$: 7.84 to 12.13 mol %
$MgTiO_3$: 3.11 to 4.72 mol % and
$Bi_2TiO_5$: 0.10 to 0.60 mol % in total of 100 mol % of the main component.

2. The high permittivity dielectric ceramic composition as set forth in claim 1, wherein 0.2 wt % or less (excepting 0) of $SiO_2$ is further included with respect to 100 wt % of said main component.

3. A high permittivity dielectric ceramic composition, comprising 0.1 wt % or less (excepting 0) of NiO, 0.1 wt % or less (excepting 0) of $CeO_2$, and 0.2 wt % or less (excepting 0) of MnO with respect to 100 wt % of a main component including $BaTiO_3$: 74.38 to 79.79 mol %
$BaZrO_3$: 7.33 to 10.15 mol %
$CaTiO_3$: 8.34 to 12.13 mol %
$MgTiO_3$: 3.40 to 3.76 mol % and
$Bi_2TiO_5$: 0.10 to 0.60 mol % in total of 100 mol % of the main component.

4. The high permittivity dielectric ceramic composition as set forth in claim 3, wherein 0.2 wt % or less (excepting 0) of $SiO_2$ is further included with respect to 100 wt % of said main component.

5. The high permittivity dielectric ceramic composition as set forth in claim 3, wherein 0.04 to 0.10 wt % of NiO, 0.03 to 0.10 wt % of $CeO_2$, and 0.01 to 0.19 wt % (excepting 0) of MnO are included with respect to 100 wt % of said main component.

6. The high permittivity dielectric ceramic composition as set forth in claim 1, wherein a relative permittivity is 9000 or more.

7. The high permittivity dielectric ceramic composition as set forth in claim 3, wherein a relative permittivity is 9000 or more.

8. An electronic device comprising a dielectric layer, wherein said dielectric layer comprises 0.1 wt % or less (excepting 0) of NiO, 0.1 wt % or less (excepting 0) of $CeO_2$, and 0.2 wt % or less (excepting 0) of MnO with respect to 100 wt % of a main component including $BaTiO_3$: 74.24 to 79.97 mol %
$BaZrO_3$: 5.69 to 12.04 mol %
$CaTiO_3$: 7.84 to 12.13 mol %
$MgTiO_3$: 3.11 to 4.72 mol % and
$Bi_2TiO_5$: 0.10 to 0.60 mol % in total of 100 mol % of the main component.

9. The electronic device as set forth in claim 8, wherein said dielectric layer further comprises 0.2 wt % or less (excepting 0) of $SiO_2$ with respect to 100 wt % of said main component.

10. An electronic device comprising a dielectric layer, wherein said dielectric layer comprises 0.1 wt % or less (excepting 0) of NiO, 0.1 wt % or less (excepting 0) of $CeO_2$, and 0.2 wt % or less (excepting 0) of MnO with respect to 100 wt % of a main component including $BaTiO_3$: 74.38 to 79.79 mol %
$BaZrO_3$: 7.33 to 10.15 mol %
$CaTiO_3$: 8.34 to 12.13 mol %
$MgTiO_3$: 3.40 to 3.76 mol % and
$Bi_2TiO_5$: 0.10 to 0.60 mol % in total of 100 mol % of the main component.

11. The electronic device as set forth in claim 10, wherein said dielectric layer further comprises 0.2 wt % or less (excepting 0) of $SiO_2$ with respect to 100 wt % of said main component.

12. The electronic device as set forth in claim 10, wherein said dielectric layer comprises 0.04 to 0.10 wt % of NiO, 0.03 to 0.10 wt % of $CeO_2$, and 0.01 to 0.19 wt % (excepting 0) of MnO with respect to 100 wt % of said main component.

* * * * *